US012317039B2

(12) United States Patent
Wen et al.

(10) Patent No.: US 12,317,039 B2
(45) Date of Patent: May 27, 2025

(54) BONE CONDUCTION RECEIVER

(71) Applicant: Transound Electronics Co., Ltd., Dongguan (CN)

(72) Inventors: Tseng-Feng Wen, Dongguan (CN); Hui Xue, Dongguan (CN); Yangfang Chen, Dongguan (CN)

(73) Assignee: TRANSOUND ELECTRONICS CO., LTD., Dongguan (CN)

( * ) Notice: Subject to any disclaimer, the term of this patent is extended or adjusted under 35 U.S.C. 154(b) by 250 days.

(21) Appl. No.: 18/139,925

(22) Filed: Apr. 26, 2023

(65) Prior Publication Data

US 2024/0155298 A1 May 9, 2024

(30) Foreign Application Priority Data

Nov. 9, 2022 (CN) ........................ 202222979978.X

(51) Int. Cl.
*H04R 25/00* (2006.01)

(52) U.S. Cl.
CPC ....... *H04R 25/606* (2013.01); *H04R 2460/13* (2013.01)

(58) Field of Classification Search
CPC .......................... H04R 25/606; H04R 2460/13
USPC .......................................................... 381/326
See application file for complete search history.

(56) References Cited

U.S. PATENT DOCUMENTS 7,961,553 B2 * 6/2011 Kang ........................ H04R 1/24 381/151
11,711,659 B2 * 7/2023 Song .................... H04R 1/1041 381/322
11,736,854 B2 * 8/2023 Wang ..................... H04R 1/105 381/74
2009/0285417 A1 * 11/2009 Shin ......................... H04R 9/06 381/151
2011/0317859 A1 * 12/2011 Jinton .................. H04R 25/606 381/326
2023/0232168 A1 * 7/2023 Qi .......................... G10K 11/22 381/345

* cited by examiner

*Primary Examiner* — Sean H Nguyen
(74) *Attorney, Agent, or Firm* — Leong C. Lei

(57) ABSTRACT

A bone conduction receiver includes a housing, a vibrating plate, a bracket, a magnetic loop assembly, a coil, and a protective cover. The vibrating plate is disposed inside the housing and keeps a distance from an inner bottom of the housing. The protective cover is located on one side of the vibrating plate, facing away from the inner bottom of the housing, and covers the opening of the accommodation room. The bracket is located on the side of the vibrating plate, facing away from the inner bottom of the housing. The magnetic loop assembly is secured in the bracket. One end of the coil is fixed to an inner side of the protective cover, and another end of the coil extends into the bracket and surrounds the magnetic loop assembly.

11 Claims, 5 Drawing Sheets

BONE CONDUCTION RECEIVER

BACKGROUND OF THE INVENTION

1. Field of the Invention

The present invention relates to an acoustic device, and more particularly to a bone conduction receiver.

2. Description of the Prior Art

Bone conduction receivers are suitable for deaf people with congenital hypoplasia of the external ear, such as atresia of the external auditory canal and no auricle; patients with external ear diseases or middle ear diseases, such as purulent otitis media and those who are not suitable for wearing air conduction hearing aids; suitable for hearing loss less than or equal to 60 dBHL, patients with conductive hearing loss but having normal bone conduction hearing, and patients with other conductive hearing loss. The bone conduction receiver enables the user to hear the sound through the principle of bone conduction.

A conventional bone conduction receiver comprises a housing, a backing ring, a support seat, a vibrating plate, a bracket, a magnetic loop assembly, a coil, and a circuit board. The backing ring, the support seat, the vibrating plate, the bracket, the magnetic loop assembly and the coil are located in the housing. Then, the circuit board covers the opening of the housing. The edge of the opening of the housing is riveted to the circuit board to realize encapsulation. Such a structure is only applied to a circular bone conduction receiver, but not applied to an oval or rectangular bone conduction receiver. The adjacent sides may be compressed each other in the riveting process due to the intersection angle. As a result, the failure of the riveting process leads to poor sealing of encapsulation. The product may have excessive distortion, which cannot guarantee the stability of the frequency response. The consistency of bandwidth extension is low. The assembly efficiency of encapsulation by riveting is low, so it is difficult to guarantee the product yield.

Therefore, a new technology needs to be developed to solve the above problems.

SUMMARY OF THE INVENTION

In view of the deficiencies of the prior art, the primary object of the present invention is to provide a bone conduction receiver, which does not require riveting and crimping for encapsulation. The assembly efficiency and product yield are improved. The distortion is small. The frequency response is stable. The bandwidth extension consistency is high.

In order to achieve the above object, the present invention adopts the following technical solutions:

A bone conduction receiver comprises a housing, a vibrating plate, a bracket, a magnetic loop assembly, a coil, and a protective cover.

The housing has an accommodation room with an opening facing upwards. The vibrating plate, the bracket, the magnetic loop assembly and the coil are located in the accommodation room. The bracket is hollow. The vibrating plate is disposed inside the housing and keeps a distance from an inner bottom of the housing. The protective cover is located on one side of the vibrating plate, facing away from the inner bottom of the housing, and covers the opening of the accommodation room. The bracket is located on the side of the vibrating plate, facing away from the inner bottom of the housing. The magnetic loop assembly is secured in the bracket. One end of the coil is fixed to an inner side of the protective cover. Another end of the coil extends into the bracket and surrounds the magnetic loop assembly.

Compared with the prior art, the present invention has obvious advantages and beneficial effects. Specifically, by providing the protective cover, the protective cover covers the opening of the accommodation room. The circuit board is connected to one side of the protective cover, facing away from the housing. There is no need for the edge of the housing to be riveted and crimped. The protective cover realizes encapsulation. In this way, the assembly efficiency and product yield are improved. The distortion is small. The frequency response is stable. The bandwidth extension consistency is high. The protective cover can be applied to bone conduction receivers of different shapes.

DETAILED DESCRIPTION OF THE PREFERRED EMBODIMENTS

Figure 1:
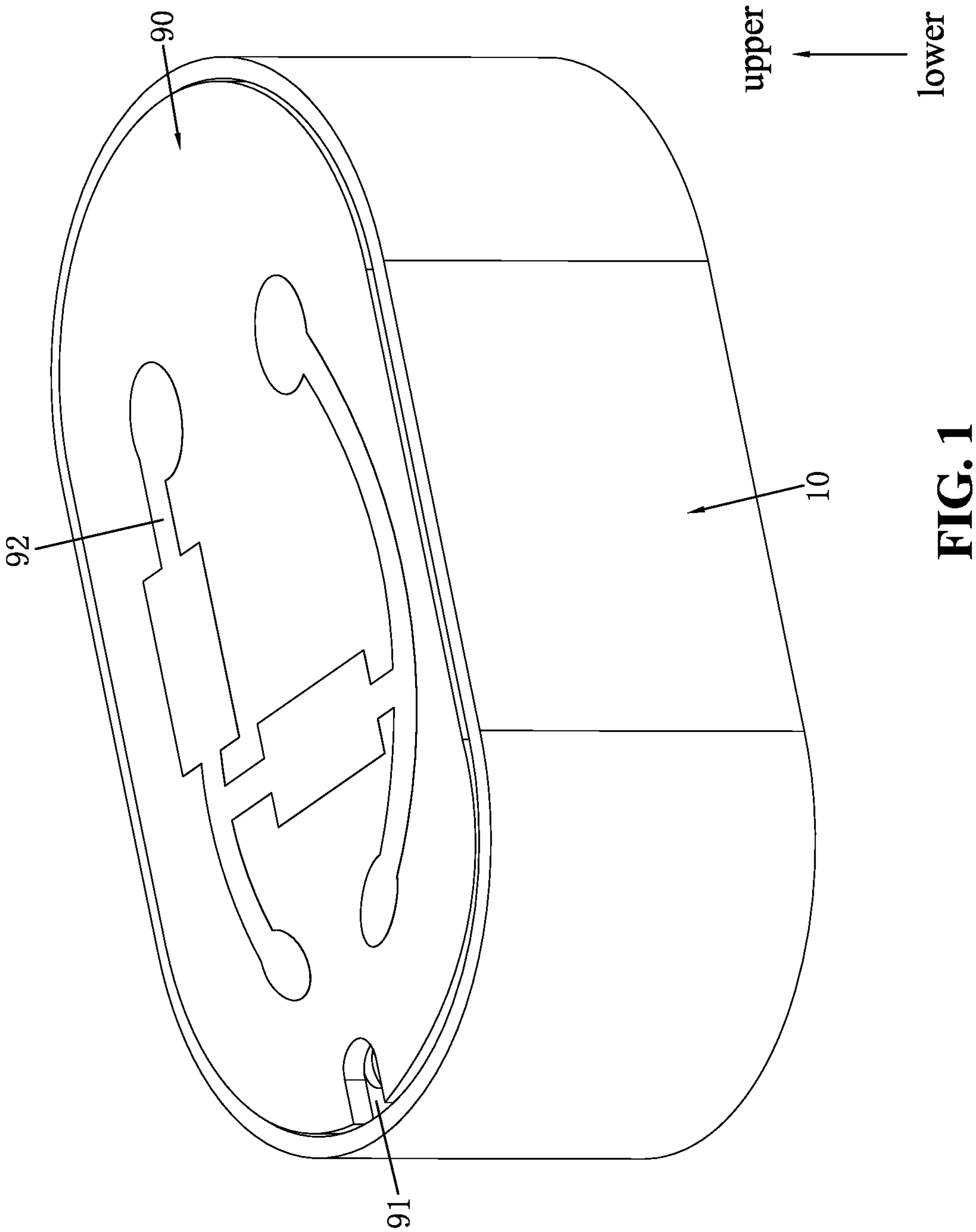
FIG. 1 is a perspective view according to an embodiment of the present invention.

FIGS. 1 to 5 show the specific structure of an embodiment of the present invention.

A bone conduction receiver comprises a housing 10, a backing ring 20, a vibrating plate 30, a bracket 40, a magnetic loop assembly 101, a coil 70, a protective cover 80, and a circuit board 90. In this embodiment, the housing 10, the backing ring 20, the vibrating plate 30, the bracket 40, the magnetic loop assembly 101, the coil 70, the protective cover 80 and the circuit board 90 all have an oval shape, but not limited thereto. They may be in a different shape according to the actual production needs. The housing 10 has an accommodation room 11 with an opening 12 facing upwards. The backing ring 20, the vibrating plate 30, the bracket 40, the magnetic loop assembly 101 and the coil 70 are all located in the accommodation room 11. Both the backing ring 20 and the bracket 40 are hollow. The vibrating plate 30 is disposed inside the housing 10 and keeps a distance from an inner bottom 13 of the housing 10. Specifically, the lower end of the backing ring 20 abuts against the inner bottom 13 of the housing 10, and the vibrating plate 30 abuts against the upper end of the backing ring 20. The protective cover 80 is located on one side of the vibrating plate 30, facing away from the inner bottom 13 of the housing 10, and covers the opening 12 of the accommodation room 11. Specifically, the protective cover 80 is located on one side of the vibrating plate 30, facing away from the backing ring 20, and covers the opening 12 of the accommodation room 11. The bracket 40 is located on one side of the vibrating plate 30, facing away from the inner bottom 13 of the housing 10. Specifically, the bracket 40 is located on one side of the vibrating plate 30, facing away from the backing ring 20, and is located inside the protective over 80. Specifically, in this embodiment, the protective cover 80 abuts against the upper end of the vibrating plate 30 and covers the opening 12 of the accommodation room 11. The bracket 40 abuts against the upper end of the vibrating plate 30 and is located inside the protective over 80. The magnetic loop assembly 101 is secured in the bracket 40. The outer peripheral wall of the protective cover 80 is confined by the inner peripheral wall surface of the housing 10. One end of the coil 70 is fixed to an inner side 82 of the protective cover 80, and the other end of the coil 70 extends into the bracket 40 and surrounds the periphery of the magnetic loop assembly 101. The circuit board 90 is connected to one side of the protective cover 80, facing away from the housing 10. The outer peripheral wall of the circuit board 90 is confined by the inner peripheral wall surface of the housing 10. In this embodiment, the circuit board 90 is glued to one side of the protective cover 80, facing away from the housing 10. The circuit board 90 may be connected to the protective cover 80 by other connection methods, such as using screws. The protective cover 80 has a through hole 81 passing through the inner and outer sides of the protective cover 80. The through hole 81 communicates with the accommodation room 11. The circuit board 90 has a receiving hole 91 passing through the upper and lower sides of the circuit board 90. The receiving hole 91 corresponds in position to the through hole 81 for insertion of the wire of the coil 70. By providing the protective cover 80, the protective cover 80 covers the opening 12 of the accommodation room 11, and the circuit board 90 is connected to one side of the protective cover 80, facing away from the housing 10. There is no need for the edge of the housing 10 to be riveted and crimped. The protective cover 80 realizes encapsulation. In this way, the assembly efficiency and product yield are improved. The distortion is small. The frequency response is stable. The bandwidth extension consistency is high. The protective cover 80 can be applied to bone conduction receivers of different shapes.

Figure 2:
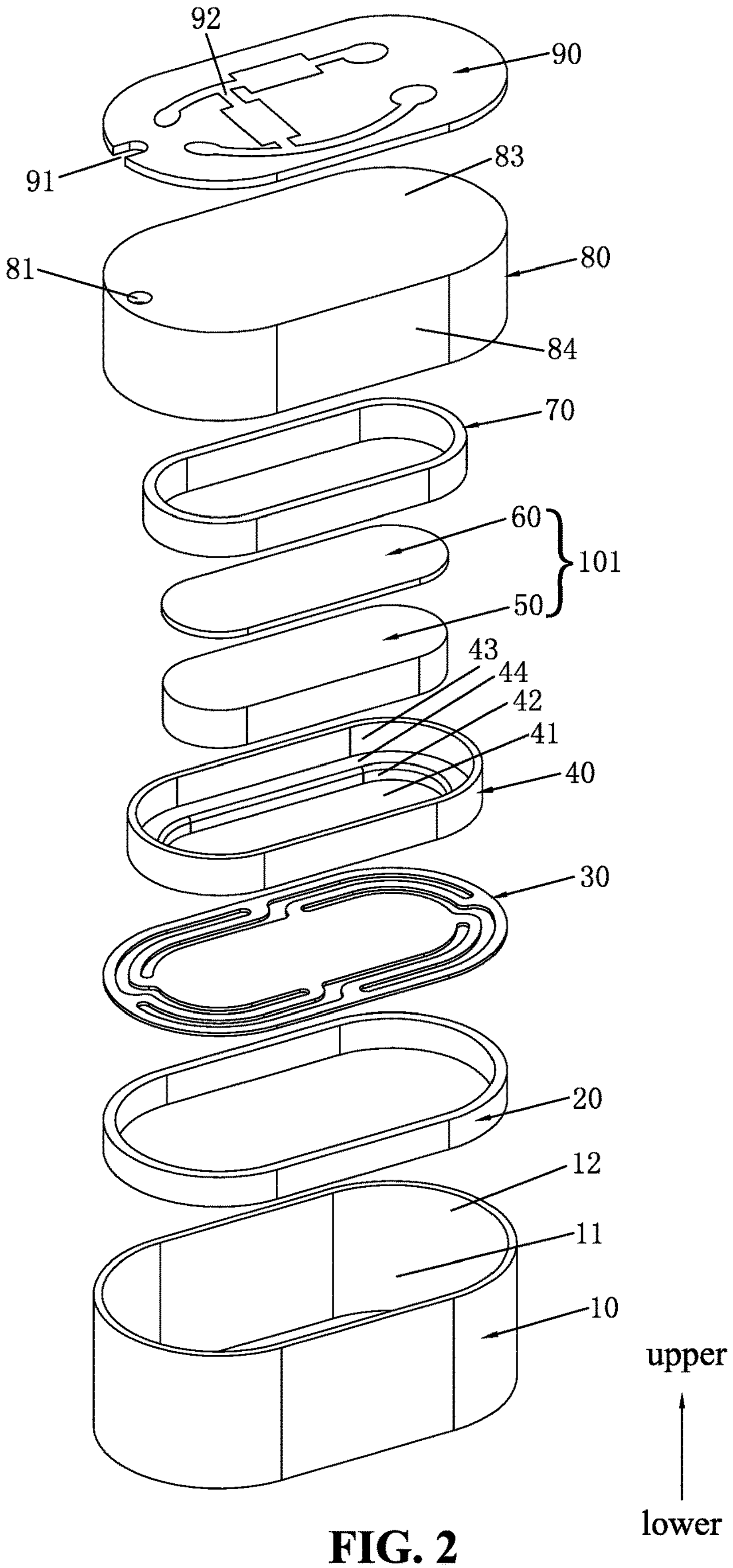
FIG. 2 is an exploded view according to the embodiment of the present invention.

As shown in FIG. 1 and FIG. 2, a filter circuit 92 is provided on the upper surface of the circuit board 90 to filter out the noise generated by the bone conduction receiver in the course of work and to improve the clarity and quality of the sound sent and received by the bone conduction receiver, thereby improving user experience.

Figure 3:
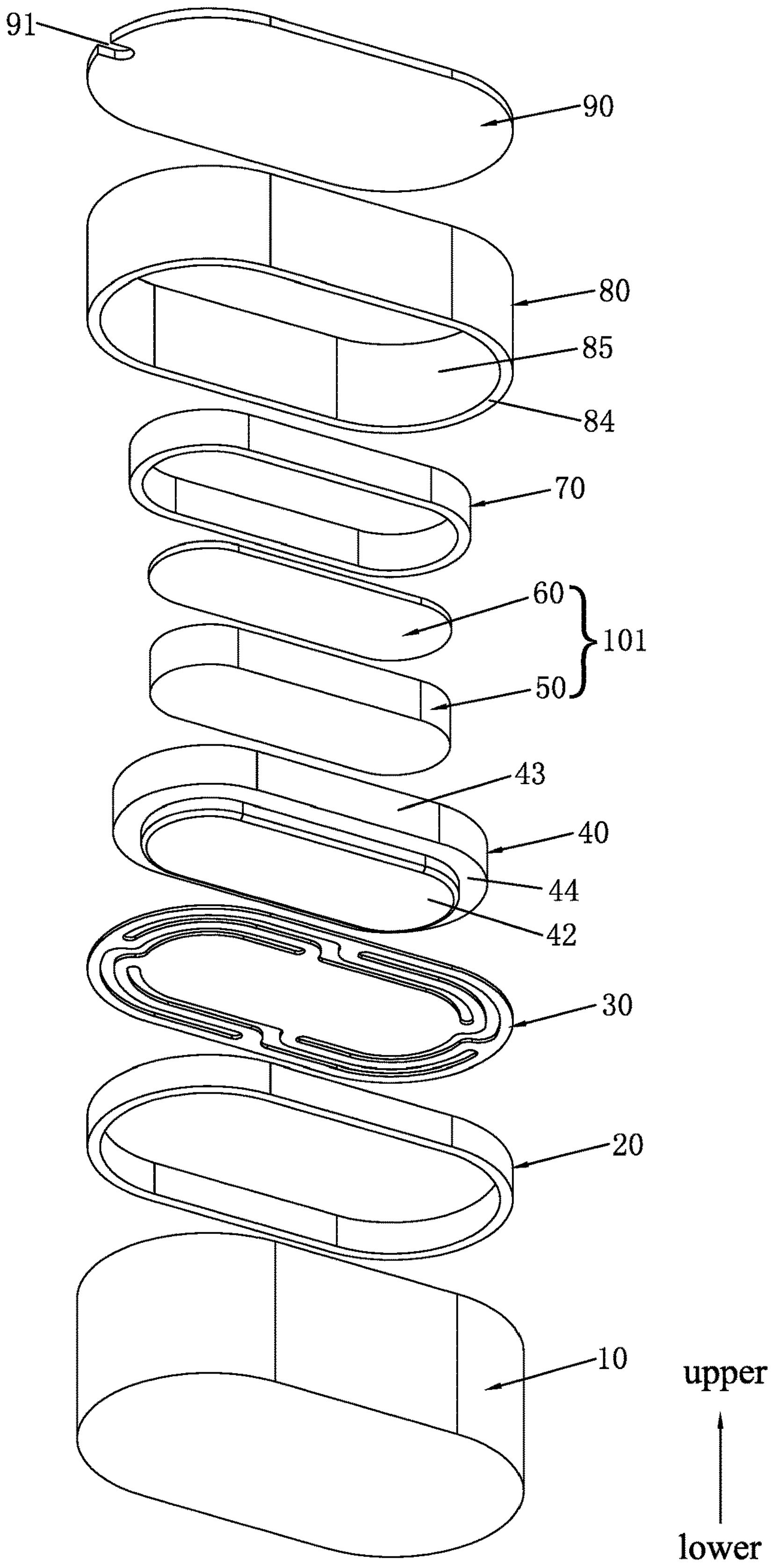
FIG. 3 is another exploded view according to the embodiment of the present invention.
Figure 4:
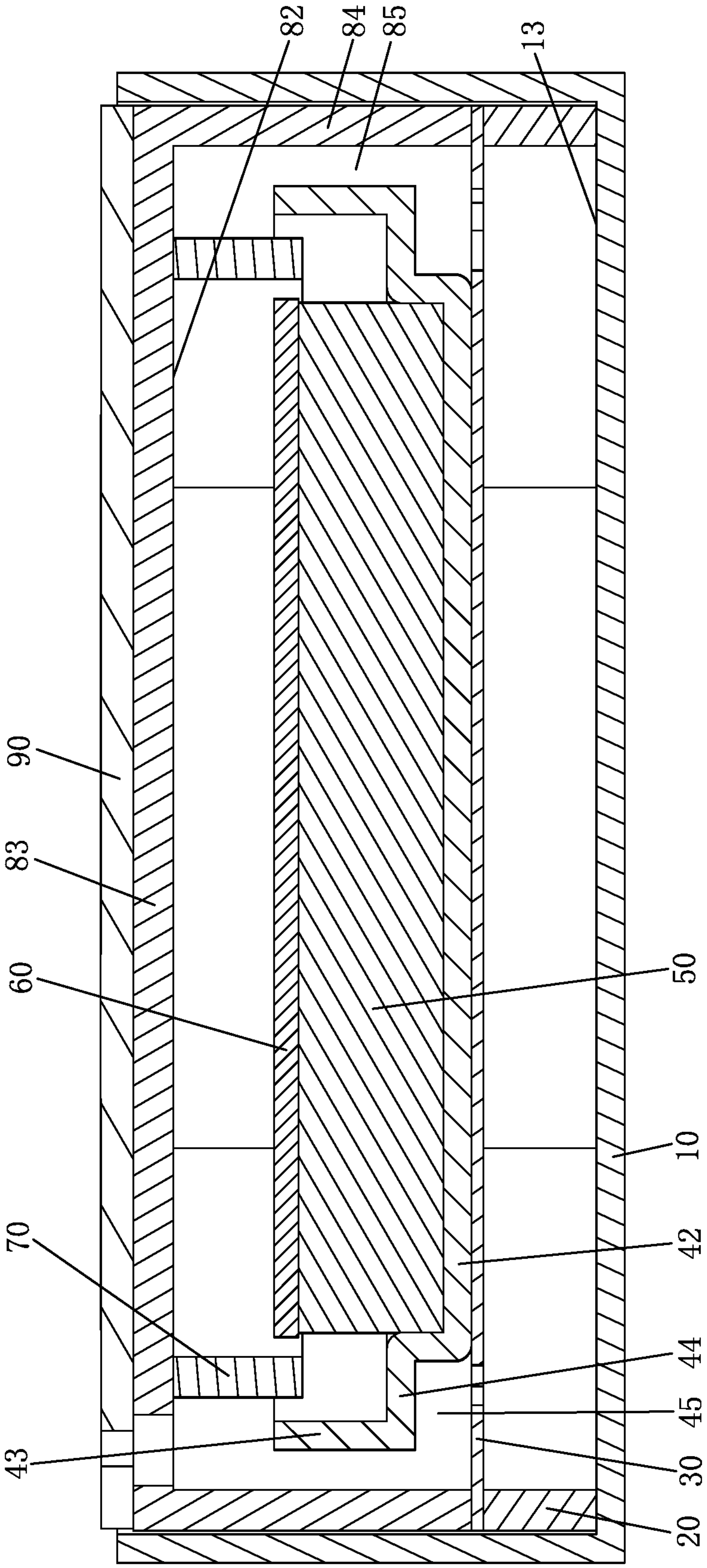
FIG. 4 is a cross-sectional view according to the embodiment of the present invention.

As shown in FIG. 2, FIG. 3 and FIG. 4, the protective cover 80 includes a body portion 83, a support portion 84 extending downwards from the periphery of one end of the body portion 83, and an inner room 85 surrounded by the support portion 84 and the body portion 83. One end of the support portion 84, away from the body portion 83, extends into the accommodation room 11 and abuts against the upper end of the vibrating plate 30. The body portion 83 covers the opening 12 of the accommodation room 11. The bracket 40, the magnetic loop assembly 101 and the coil 70 are all located in the inner room 85 of the protective cover 80. The upper end of the coil 70 is connected to the lower end of the body portion 83. The through hole 81 is disposed on the body portion 83. The through hole 81 communicates with the inner room 85.

As shown in FIG. 2, FIG. 3 and FIG. 4, the bracket 40 includes a first positioning portion 42 and a second positioning portion 43. The periphery of one end of the first positioning portion 42 extends outwardly to form a connecting portion 44. The connecting portion 44 is connected to one end of the second positioning portion 43. The space surrounded by the first positioning portion 42 communicates with the space surrounded by the second positioning portion 43. The magnetic loop assembly 101 is partly accommodated in the first positioning portion 42 and extends toward the second positioning portion 43 and is spaced from the inner peripheral wall of the second positioning portion 43. One side of the first positioning portion 42, facing away from the magnetic loop assembly 101, abuts against one side of the vibrating plate 30, facing away from the inner bottom of the housing 10. Specifically, one side of the first positioning portion 42, facing away from the magnetic loop assembly 101, abuts against one side of the vibrating plate 30, facing away from the backing ring 20. A spacing 45 is defined between the connecting portion 44 and the vibrating plate 30.

As shown in FIG. 2, FIG. 3 and FIG. 4, the magnetic loop assembly 101 includes a magnet 50 and a washer 60. The magnet 50 is partly accommodated in the first positioning portion 42 and extends toward the second positioning portion 43 and is spaced from the inner peripheral wall of the second positioning portion 43. The washer 60 is disposed on the upper end of the magnet 50. The lower end of the coil 70 extends into the second positioning portion 43 and is spaced from the inner peripheral wall of the second positioning portion 43. The lower end of the coil 70 surrounds the periphery of the magnet 50 and the periphery of the washer 60. The inner peripheral wall surface of the coil 70 is spaced from the outer peripheral wall surface of the magnet 50. The inner peripheral wall surface of the coil 70 is spaced from the outer peripheral wall surface of the washer 60. The outer wall surface of the second positioning portion 43 is spaced from the inner wall surface of the support portion 84 of the protective cover 80. In this way, the bandwidth of the product is wider, and the effect of low frequency is better. In this embodiment, a positioning cavity 41 is formed in the first positioning portion 42. The lower end of the magnet 50 is positioned in the positioning cavity 41, and the upper end of the magnet 50 extends into the second positioning portion 43, so that the magnet 50 is positioned in the bracket 40 stably. The magnet 50 is connected to the bracket 40 by means of gluing, using screws, laser welding, etc. The washer 60 is connected to the magnet 50 by means of gluing, using screws, laser welding, etc. The coil 70 is glued to the inner side 82 of the protective cover 80. Specifically, the coil 70 is glued to the lower end of the body portion 83. The bracket 40 is connected to the vibrating plate 30 by means of gluing, using screws, laser welding, etc. The backing ring 20 is connected to the housing 10 by means of gluing, using screws, laser welding, etc. The vibrating plate 30 is connected to the backing ring 20 by means of gluing, using screws, laser welding, etc. The protective cover 80 is connected to the backing ring 20 by means of gluing, using screws, laser welding, etc.

Figure 5:
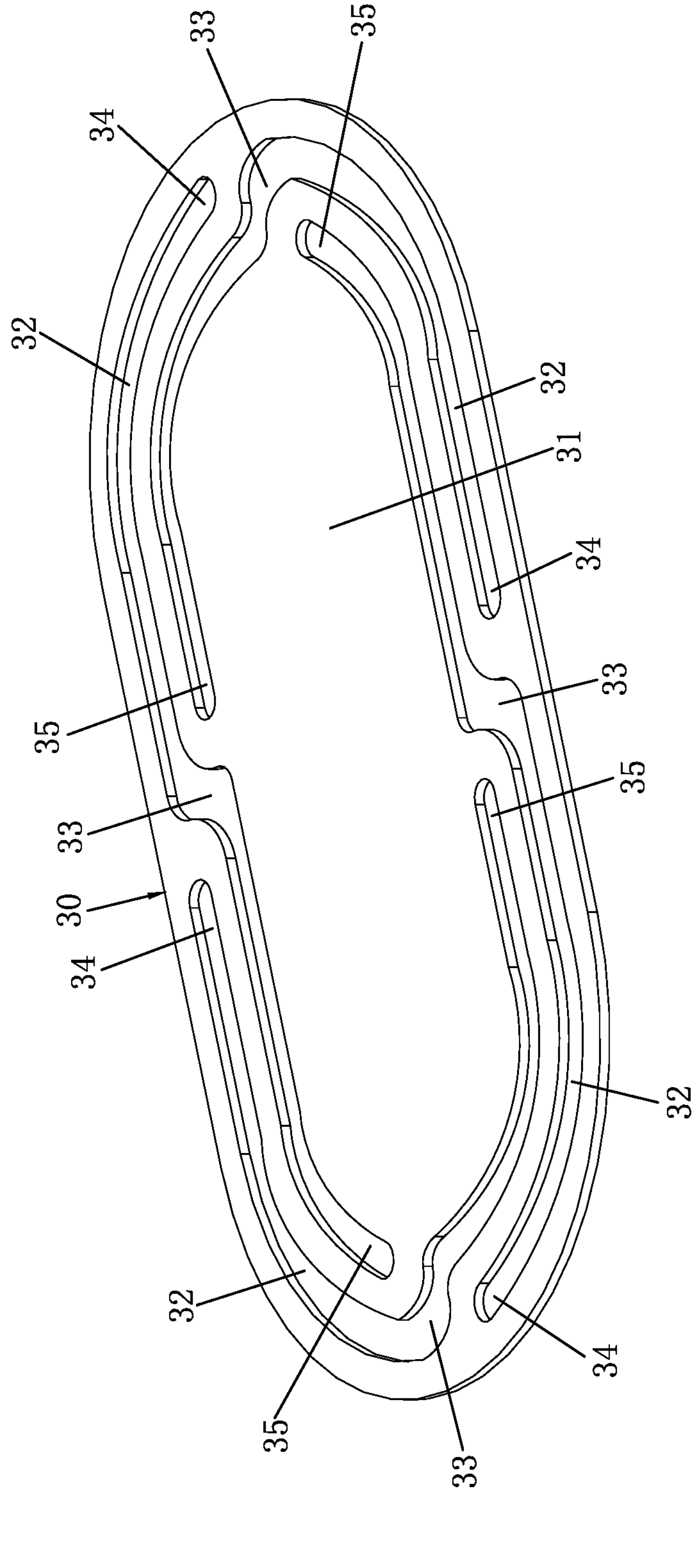
FIG. 5 is a perspective view of the vibrating plate according to the embodiment of the present invention.

As shown in FIG. 5, in this embodiment, the vibrating plate 30 includes a main body 31 and a plurality of through grooves 32 on the main body 31. The through grooves 32 pass through the upper and lower ends of the main body 31. The through grooves 32 are arranged alternately around a central portion of the main body 31. Each through groove 32 has a head end 34, a tail end 35, and a bent portion 33. The bent portion 33 is located between the head end 34 and the tail end 35. The number of the through grooves 32 is four, but not limited thereto. The number of the through grooves 32 depends on the actual production demand.

In actual production, the product may be sealed by riveting and crimping if necessary. A crimp is provided at the opening 12 of the housing 10. The crimp is adjacent to the opening 12 and bent inwardly. The crimp has at least one notch. In this way, the complete structure of the crimp is cut by the notch to reduce the structural strength, reduce the force required for mechanical bending, improve the reliability of the bend of the crimp, prevent the crimp from springing back and increase the sealing performance. The notch may be disposed at the intersection angle of the oval or rectangular housing. In this way, the notch gives enough space, so that the adjacent sides can be riveted at the notch in the riveting process. There will be no phenomenon of poor sealing duce to the riveting failure caused by mutual compression, so that the oval or rectangular bone conduction can be sealed by riveting.

What is claimed is:

1. A bone conduction receiver, comprising a housing, a vibrating plate, a bracket, a magnetic loop assembly, a coil, and a protective cover:

the housing having an accommodation room with an opening facing upwards, the vibrating plate, the bracket, the magnetic loop assembly and the coil being located in the accommodation room, the bracket being hollow, the vibrating plate being disposed inside the housing and keeping a distance from an inner bottom of the housing, the protective cover being located on one side of the vibrating plate, facing away from the inner bottom of the housing and covering the opening of the accommodation room, the bracket being located on the side of the vibrating plate, facing away from the inner bottom of the housing, the magnetic loop assembly being secured in the bracket; one end of the coil being fixed to an inner side of the protective cover, another end of the coil extending into the bracket and surrounding the magnetic loop assembly.

2. The bone conduction receiver as claimed in claim 1, wherein the protective cover includes a body portion, a support portion extending downwards from a periphery of one end of the body portion, and an inner room surrounded by the support portion and the body portion; one end of the support portion, away from the body portion, extends into the accommodation room and abuts against an upper end of the vibrating plate, the body portion covers the opening of the accommodation room, the bracket, the magnetic loop assembly and the coil are located in the inner room of the protective cover, and an upper end of the coil is connected to a lower end of the body portion.

3. The bone conduction receiver as claimed in claim 1, wherein the bracket includes a first positioning portion and a second positioning portion; a periphery of one end of the first positioning portion extends outwardly to form a connecting portion; the connecting portion is connected to one end of the second positioning portion, a space surrounded by the first positioning portion communicates with a space surrounded by the second positioning portion; the magnetic loop assembly is partly accommodated in the first positioning portion and extends toward the second positioning portion and is spaced from an inner peripheral wall of the second positioning portion.

4. The bone conduction receiver as claimed in claim 3, wherein the magnetic loop assembly includes a magnet and a washer; the magnet is partly accommodated in the first positioning portion and extends toward the second positioning portion and is spaced from the inner peripheral wall of the second positioning portion; the washer is disposed on an upper end of the magnet, an lower end of the coil extends into the second positioning portion and is spaced from the inner peripheral wall of the second positioning portion, the lower end of the coil surrounds the magnet and the washer; an inner peripheral wall surface of the coil is spaced from an outer peripheral wall surface of the magnet, and the inner peripheral wall surface of the coil is spaced from an outer peripheral wall surface of the washer.

5. The bone conduction receiver as claimed in claim 4, wherein a positioning cavity is formed in the first positioning portion, a lower end of the magnet is positioned in the positioning cavity, and the upper end of the magnet extends into the second positioning portion.

6. The bone conduction receiver as claimed in claim 3, wherein one side of the first positioning portion, facing away from the magnetic loop assembly, abuts against the side of the vibrating plate, facing away from the inner bottom of the housing, and a spacing is defined between the connecting portion and the vibrating plate.

7. The bone conduction receiver as claimed in claim 1, wherein a circuit board is connected to one side of the protective cover, facing away from the housing.

8. The bone conduction receiver as claimed in claim 7, wherein the circuit board is glued to the side of the protective cover, facing away from the housing.

9. The bone conduction receiver as claimed in claim 7, wherein the protective cover has a through hole, the through hole communicates with the accommodation room, the circuit board has a receiving hole passing through upper and lower sides of the circuit board, and the receiving hole corresponds in position to the through hole.

10. The bone conduction receiver as claimed in claim 1, wherein the vibrating plate includes a main body and a plurality of through grooves on the main body, the through grooves are arranged alternately around a central portion of the main body; the through grooves each have a head end, a tail end and a bent portion, and the bent portion is located between the head end and the tail end.

11. The bone conduction receiver as claimed in claim 1, wherein a backing ring is provided on the inner bottom of the housing, the backing ring is hollow, a lower end of the backing ring abuts against the inner bottom of the housing, and the vibrating plate abuts against an upper end of the backing ring.

* * * * *